2 Sheets—Sheet 1.

W. C. ALLISON.

SUPPORT FOR ELECTRIC WIRES AND LAMPS IN CITIES.

No. 9,999. Reissued Jan. 3, 1882.

Attest:
[illegible]
L. J. Matos

Inventor
William C. Allison
By his atty.
[illegible]

THE NORRIS PETERS CO., PHOTO-LITHO., WASHINGTON, D. C.

2 Sheets—Sheet 2.
W. C. ALLISON.
SUPPORT FOR ELECTRIC WIRES AND LAMPS IN CITIES.
No. 9,999. Reissued Jan. 3, 1882.
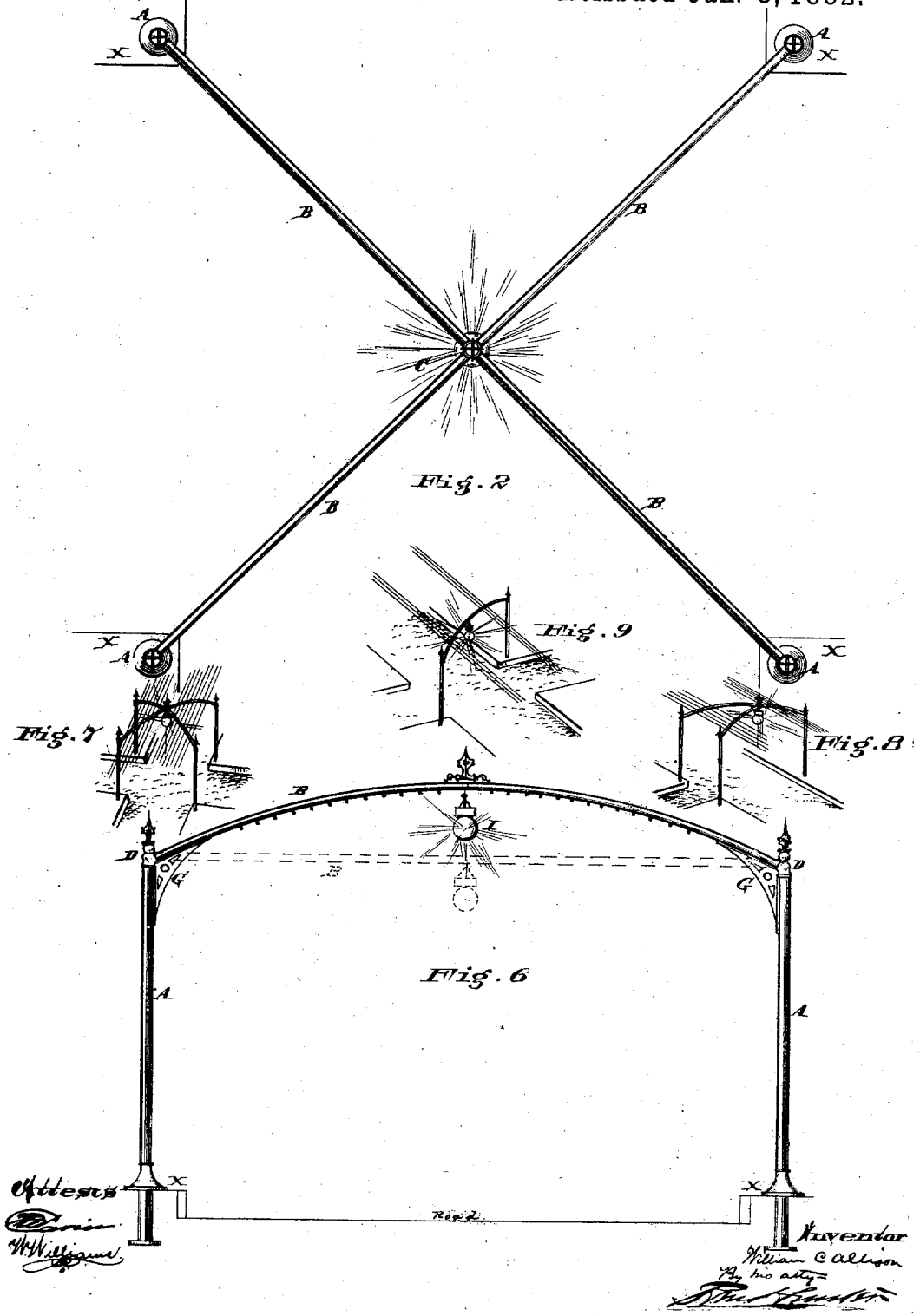
THE NORRIS PETERS CO., PHOTO-LITHO., WASHINGTON, D. C.

UNITED STATES PATENT OFFICE.

WILLIAM C. ALLISON, OF PHILADELPHIA, PENNSYLVANIA.

SUPPORT FOR ELECTRIC WIRES AND LAMPS IN CITIES.

SPECIFICATION forming part of Reissued Letters Patent No. 9,999, dated January 3, 1882.

Original No. 241,179, dated May 10, 1881. Application for reissue filed September 8, 1881.

*To all whom it may concern:*

Be it known that I, WILLIAM C. ALLISON, of the city and county of Philadelphia, and State of Pennsylvania, have invented an Improvement in Electric-Wire and Electric-Lamp Supports in Cities, of which the following is a specification.

My invention has reference to supports for telegraph, telephonic, and electric wires in general, and also for electric lamps; and it consists in arching or spanning the streets from curb to curb diagonally from the four corners at the intersection of two streets, or from the two diagonally-opposite corners alone, and providing said arches with insulated supports for wires, and in modifications, as set forth hereinafter, the arches to be made of tubing, solid bars, or their equivalent, and may be provided with insulated supports on top for the electric wires, which may be supported from arch to arch.

The object of my invention is to provide suitable support for the increasing number of electric wires without preventing the passage of light to the upper stories of buildings, and at the same time to place the wires in a convenient location for easy repair and inspection.

My invention has further for its object the support of electric lamps in the middle of the crossings and streets and about twenty feet from the ground, so that a maximum effect will be obtained and the light can be seen everywhere from the street.

Heretofore towers have been used to light cities by electricity, said towers being supported from the road or sidewalk and extending far up above the tops of the houses, and carrying at the top a large number of electric lamps arranged in a circle around said tower, there being one of these light-towers to every five or six blocks. An illustration of this method is shown in the patent to Spalding, No. 235,913. My method does not conflict with the above in any way, as my lights are designed to be hung at every corner and in close proximity to the street.

Figure 1:
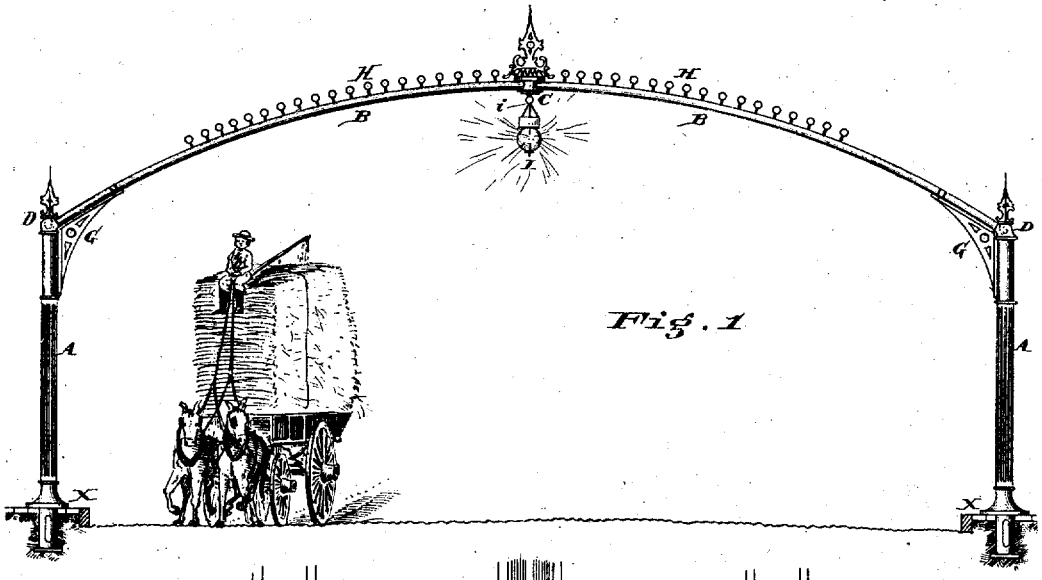
Figure 4:
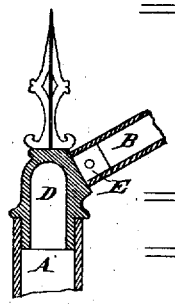
Figure 3:
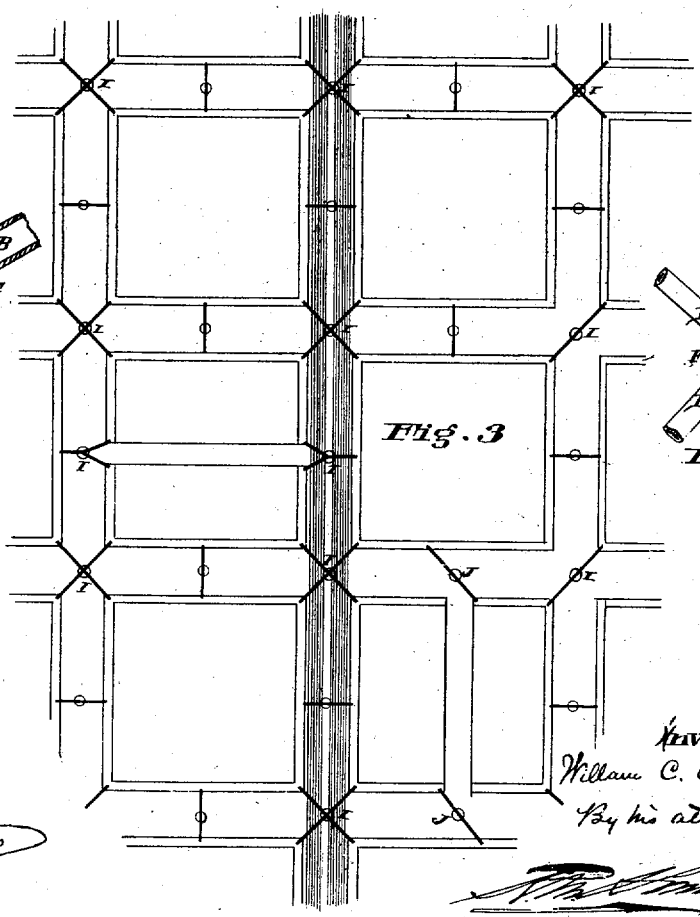
Figure 5:
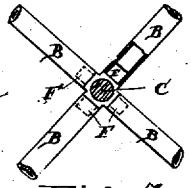

In the drawings, Figure 1 is an elevation of a double-arch sprung from the four corners of two crossing streets, said arch being united in the middle. Fig 2 is a plan of same. Fig. 3 shows a diagram of streets and the method of arranging the arches and lamps. Figs. 4 and 5 show details of construction. Fig. 6 shows an elevation of an arch for the middle of the square, (between two streets,) or from the two corners diagonally opposite at a crossing, and as made entirely of wrought-iron tubing. Fig. 7 is a small perspective view of a corner arch. Fig. 8 is a perspective of a triangular arch at junction of small and large streets. Fig. 9 shows the single arch at crossing.

A are the supporting-posts, and may be made of cast-iron, as shown in Fig. 1, or of tubing, as shown in Fig. 6. They may be constructed of any desirable design and properly secured to the ground. At the cross of two streets one of these posts A may be secured upon each corner X, or upon two corners diagonally opposite, and the arches B B, made of wrought-iron tubing, are sprung from post to post diagonally across the street, in the former case crossing in the middle, where they are secured to casting C; or simple girders may be used, as shown in dotted lines, Fig. 6. Hence each double arch is composed of four sections secured to the castings D on top of the cast or wrought-iron posts A and the casting C at the cross of the arches. This is shown in Figs. 1, 2, and 7. The castings D are secured in any suitable manner on top of posts A, as shown in Fig. 4, and a projecting lug, E, from said piece D extends upward at an angle corresponding to the arch, and over this projection the arch-tubing B fits, and is secured by driving a pin through or in any other equivalent manner. The four sections of the arches B are united in the middle by fitting over the lugs F on the central casting, C, as shown in Fig. 5, or in any other desirable manner; or the arches may be made of one section and spring from post to post, crossing in the middle, as shown in Figs. 6 and 9. The sections B may be further secured to the posts and supported thereon by brackets G.

Along the upper part of the arches are the insulated rings or pins H for supporting and carrying the electric wires. These insulated projections may project downward, if desired.

The electric lamp I is hung at the intersection of the two arches, or in the middle of the single diagonal arch, as shown in Fig. 9, being insulated from said arch or arches, and consequently is located in the middle of the two streets where it is desired. The arches or girders in the middle of the square are similar in construction to those already described, and are simple or single arches or girders, as shown in Fig. 6; and if in this case the arch B is made of sections, they must be very firmly connected in the middle, as this arch is not supported against lateral strain other than by the electric wires, as in the case of the double arch previously set forth. These arches are provided with the insulated supports H for the electric wires, and may also have a suitable insulated support for the electric lamp in the middle. Where a small street runs into a larger one the arching would be in all respects similar in construction to those already cited, only in this case there will be three half-arches uniting in the middle, as shown in Fig. 8; or a single diagonal arch may be used, as shown at J in Figs. 3 and 9. The material most suitable for these arches is wrought-iron tubing; but the posts may be made of cast-iron, if desired.

By this arrangement of supports for the electric wires of all descriptions none of the light will be materially shut out, as the wires will be arranged in a single layer, and not four to eight or more above one another, as is at present the case. In a street of twenty-three squares, of four hundred and eighty feet long, and twenty-four electric lamps, or one at each cross of streets, a distance of twenty-two thousand five hundred and sixty feet, or 4.26 miles of street, will be illuminated.

The arches should be about twenty feet high in the middle, so as to be sufficiently high to escape the highest load in turning a corner, and at the same time to support the lamp at such a height that the greatest luminous effect will be obtained.

Having now described my invention, what I claim as new, and desire to secure by Letters Patent, is—

1. A support for electric wires and an electric lamp at a crossing of two streets, which consists of two simple arches or girders sprung diagonally from corner to corner and crossing in the middle, from which the electric lamp is hung, said arches being provided with insulated supports for the electric wires, substantially as and for the purpose specified.

2. In a support for electric wires and an electric lamp, the posts A, provided with caps D, furnished with lugs E, sections of tubular arches B, center casting, C, provided with lugs F, and insulated supports H on the sections B for the electric wires, substantially as shown and described.

3. In a support for electric wires, the tubular posts A, provided with caps D, or their equivalent, to support the tubular arch or girder B, in combination with one or more insulated wire-supports on the arch, substantially as and for the purpose specified.

4. A support for electric lamps and wires in cities, which consists of an arch or structure, substantially as described, supported from the diagonally-opposite corners of two crossing streets, in combination with an electric lamp hung from the middle of said arch and insulated therefrom, as and for the purpose specified.

5. In a system for lighting cities by electric lights, the combination of the two diagonally-opposite street-corners with an arch supported upon said corners and spanning the roadway diagonally, and an electric lamp suspended and insulated from the middle of said arch for the purpose of lighting up two streets from one point, substantially as and for the purpose specified.

In testimony of which invention I hereunto set my hand.

WILLIAM C. ALLISON.

Witnesses:
JAS. O'NEILL,
R. S. REED.